(12) United States Patent
Kuo et al.

(10) Patent No.: US 8,598,262 B2
(45) Date of Patent: Dec. 3, 2013

(54) COPOLYMERS FOR TREATING CONSTRUCTION AGGREGATES

(71) Applicants: Lawrence L. Kuo, Acton, MA (US); Ying Chen, Arlington, MA (US)

(72) Inventors: Lawrence L. Kuo, Acton, MA (US); Ying Chen, Arlington, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/892,701

(22) Filed: May 13, 2013

(65) Prior Publication Data

US 2013/0245162 A1    Sep. 19, 2013

Related U.S. Application Data

(62) Division of application No. 13/027,590, filed on Feb. 15, 2011, now Pat. No. 8,461,245.

(51) Int. Cl.
*C08K 3/34* (2006.01)
*C09C 1/28* (2006.01)

(52) U.S. Cl.
USPC ........... 524/445; 524/446; 106/416; 106/802; 106/803; 106/823; 525/118

(58) Field of Classification Search
USPC .......... 524/445, 446; 106/416, 802, 803, 823; 525/118
See application file for complete search history.

(56) References Cited

U.S. PATENT DOCUMENTS

| | | | |
|---|---|---|---|
| 4,048,301 A | 9/1977 | Papantoniou | |
| 4,393,939 A | 7/1983 | Smith et al. | |
| 4,471,100 A | 9/1984 | Tsubakimoto et al. | |
| 5,232,497 A | 8/1993 | Dillenbeck et al. | |
| 5,661,206 A | 8/1997 | Tanaka et al. | |
| 5,705,599 A | 1/1998 | Felixberger et al. | |
| 5,771,971 A | 6/1998 | Horton et al. | |
| 6,352,952 B1 | 3/2002 | Jardine et al. | |
| 6,484,821 B1 | 11/2002 | Patel et al. | |
| 6,569,234 B2 | 5/2003 | Yamashita et al. | |
| 6,670,415 B2 | 12/2003 | Jardine et al. | |
| 6,951,598 B2 | 10/2005 | Flugge et al. | |
| 7,740,071 B2 | 6/2010 | Smith et al. | |
| 7,846,876 B2 | 12/2010 | Koyanagi et al. | |
| 8,257,490 B2* | 9/2012 | Alain et al. | 106/802 |
| 8,461,245 B2* | 6/2013 | Kuo et al. | 524/445 |
| 2002/0155956 A1 | 10/2002 | Chamberlain et al. | |
| 2006/0147505 A1 | 7/2006 | Tanzer et al. | |
| 2007/0129516 A1* | 6/2007 | Detering et al. | 526/260 |
| 2007/0151931 A1 | 7/2007 | SenGupta et al. | |
| 2007/0287794 A1 | 12/2007 | Alain et al. | |
| 2008/0060556 A1 | 3/2008 | Jacquet et al. | |
| 2008/0300344 A1* | 12/2008 | Georges et al. | 524/5 |
| 2009/0117071 A1 | 5/2009 | Song et al. | |
| 2009/0239771 A1 | 9/2009 | Federici et al. | |
| 2009/0241696 A1 | 10/2009 | Jacquet et al. | |
| 2009/0247429 A1 | 10/2009 | Miller | |

FOREIGN PATENT DOCUMENTS

| | | |
|---|---|---|
| JP | 2005068336 A | 3/2005 |
| JP | 2005089493 A | 4/2005 |
| JP | 2006045010 A | 2/2006 |
| WO | 2009115428 A1 | 9/2009 |
| WO | 2010005117 A1 | 1/2010 |
| WO | 2010040915 A2 | 4/2010 |

OTHER PUBLICATIONS

Jarett and Dye, "Organo-amine surfactant salts as hydration suppressants for reactive clay", AADE-05_NTCE-02, Houston, Texas, Apr. 5-7, 2005, 9 pps.

* cited by examiner

*Primary Examiner* — Vickey Nerangis
(74) *Attorney, Agent, or Firm* — Craig K. Leon

(57) ABSTRACT

The present invention provides methods, admixture compositions for treating clay-bearing aggregates used for construction purposes, and aggregate compositions for construction purposes. The clay-bearing aggregates are treated with a cationic copolymer made from two and preferably three different monomer components. Cementitious compositions containing the treated aggregates are also described.

20 Claims, No Drawings

COPOLYMERS FOR TREATING CONSTRUCTION AGGREGATES

This application is a divisional based on Ser. No. 13/027,590, filed Feb. 15, 2011, and allowed.

FIELD OF THE INVENTION

This invention relates to the treatment of sand aggregates used for making construction materials, and more particularly to the mitigation of clay in construction aggregates using a cationic copolymer made from two or more monomers, one of which is quarternized.

BACKGROUND OF THE INVENTION

It is known that sand aggregates used in making construction materials such as concrete can contain clay materials that are detrimental to the concrete and/or to the efficiency of plasticizers used in the concrete.

For example, U.S. Pat. Nos. 6,352,952 and 6,670,415, owned by the common assignee hereof, Jardine et al. disclosed that certain clays, which expanded when in contact with water, were responsible for adversely affecting the dosage efficiency of "EO/PO" type superplastizicers (e.g., which contained ethylene oxide and propylene oxide groups). Jardine et al. taught that clay-activity-modifying agents, such as organic cations (such as quaternary amines which have a strong affinity for cationic exchange with clay), could be introduced to the clay before, during, or after water is introduced to the clay.

As another example, in U.S. Ser. No. 11,575,612 (Publ. No. 2007/0287794 A1) and U.S. Ser. No. 1111/575,607 (Publ. No. 2008/0060556 A1), Jacquet et al. disclosed compositions and methods for inerting clays in sand aggregates intended for use in preparing concrete. The compositions could include monomers already containing a cationic quaternary amine functional group: such as diallyldialkyl ammonium, quaternized (meth)acrylates of dialkylaminoalkyl and (meth)acrylamides N-substituted by a quaternized dialkylaminoalkyl. Particularly preferred were cationic polymers obtained by polycondensation of dimethylamine and epichlorohydrin.

SUMMARY OF THE INVENTION

The present invention relates to the treatment of clay-bearing aggregates which are used in the preparation of concrete, mortar, and asphalt, and particularly to the use of a copolymer obtained through polymerization of certain monomer components, as will be more particularly described hereinafter.

The use of the copolymer can lead to improvement of properties in the cementitious compositions, such as workability without increasing water demand, and to reducing the effort needed to wash and dispose of the clay.

An exemplary method of the present invention thus comprises: introducing to clay-bearing sand aggregates, in an amount of 5% to 60% based on weight of clay, at least one copolymer obtained from monomer components (A), (B), and optionally (C), as follows:

(A) in an amount of 0.10-0.95 mole, a first monomer component selected from quarternized vinylpyridine or other monomer represented by one of following structures

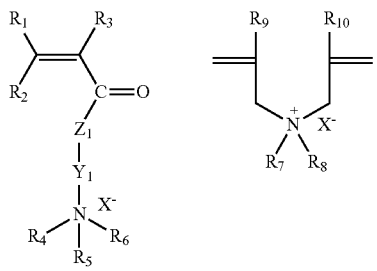

wherein
$R_1$, $R_2$, and $R_3$ each independently represent hydrogen, —$CH_3$, or —COOH;
$R_4$, $R_5$, $R_6$, $R_7$, and $R_8$ each independently represent a $C_1$-$C_4$ alkyl group;
$R_9$ and $R_{10}$ each independently represent hydrogen or —$CH_3$;
$Z_1$ represents —O— or —NH—;
$Y_1$ represents —$CH_2CH(OH)CH_2$— or —$(CH_2)_n$— wherein "n" represents an integer of 0 to 6; and
X represents a halide, pseudohalide, or sulfate; and
(B) in an amount of 0.05-0.90 mole, a second monomer represented by the structural formula

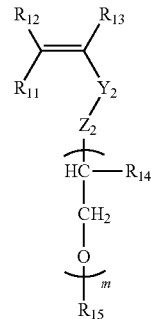

wherein
$R_{11}$, $R_{12}$, $R_{13}$, $R_{14}$, and $R_{15}$ each independently represent hydrogen or $C_1$-$C_3$ alkyl;
$Z_2$ represents —O—, —COO—, —OCO—, —COHN—, or —NHCO—;
$Y_2$ represents —$(CH_2)_n$— wherein "n" represents an integer of 0 to 6; and
"m" represents an integer of 10 to 200; and
(C) in an amount of 0-0.20 mole, a third monomer selected from the group consisting of acrylate, methacrylate, acrylamide, methacrylamide, alkyl or dialkyl acrylamide, and methacrylamide monomers.

The present invention also provides an aggregate composition made from the foregoing method. The aggregate composition can be combined with a cement binder to form a mortar or concrete, or combined with asphaltic composition to provide asphalt compositions, and can be used generally to form construction material compositions. The aggregate composition can alternatively be combined with one or more conventional admixture chemicals, such as a water reducer (e.g., superplasticizer) admixture; and may contain both a cement binder and water reducer.

The present invention also provides admixture compositions containing the above-described copolymer for treating construction material compositions in combination with at least one chemical admixture conventionally used for modifying hydratable mortar or concrete, such as one or more water reducing admixtures (e.g., a polycarboxylate comb polymer superplasticizicer), or other conventional admixture or admixtures, as will be further described in detail hereinafter.

Exemplary admixture compositions of the invention may be introduced to clay-bearing aggregates at or after the quarry or processing at an aggregates mine, or before or at the concrete mix plant, where the aggregates are combined with cement to provide mortar or concrete compositions.

Further advantages and features of the invention will be described in further detail hereinafter.

DETAILED DESCRIPTION OF EXEMPLARY EMBODIMENTS

The present invention pertains to method and compositions for treating clays in sand aggregates intended for construction material purposes.

The clays may be swelling clays of the 2:1 type (such as smectite type clays) or also of type 1:1 (such as kaolinite) or of the 2:1:1 type (such as chlorite). The term "clays" has referred to aluminum and/or magnesium silicates, including phyllosilicates having a lamellar structure, but this term may also refer to clays not having such structures, such as amorphous clays. The present invention is not limited to swelling clays, which have been seen to absorb EO/PO superplasticizers as previously mentioned in the background, but also includes the use of clays that may directly affect the properties of construction materials whether in their wet or hardened state. Clays which are commonly found in sands include, for example, montmorillonite, illite, kaolinite, muscovite, and chlorite. These are also included in the methods and compositions of the invention.

The clay-bearing sands which are treated by the method of the present invention may be used in cementitious materials, whether hydratable or not, and such cementitious materials include concrete, mortar, and asphalt, which may be used in structural building and construction applications, roadways, foundations, civil engineering applications, as well as in precast and prefabrication applications.

The term "sand" as used herein shall mean and refer to aggregate particles usually used for construction materials such as concrete, mortar, and asphalt, and this typically involves granular particles of average size between 0 and 8 mm, preferably between 2 and 6 mm. Sand aggregates may comprise calciferous, siliceous or siliceous limestone minerals. Such sands may be natural sand (e.g., derived from glacial, alluvial, or marine deposits which are typically weathered such that the particles have smooth surfaces) or may be of the "manufactured" type made using mechanical crushers or grinding devices.

The construction materials in which the sand is used include hydratable cementitious compositions, such as mortar and concrete, and also may involve asphalt compositions.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

The term "concrete" will be used herein generally to refer to a hydratable cementitious mixture comprising water, cement, sand, usually a coarse aggregate such as crushed gravel, and optional chemical admixture(s).

As used herein, the term "copolymer" or "polymer" as used herein refers to compounds containing at least two different monomer components (designated as "A" and "B") and optionally at least three different monomer components (further including optional monomer designated as "C").

The copolymers of the invention are preferably made by conventional addition polymerization techniques such as radical polymerization. Preferably, the polymerization is conducted in aqueous solution using a water soluble free radical initiator including peroxides, such as hydrogen peroxide; persulfates, such as ammonium, sodium, or potassium persulfate; and water soluble azo initiators. The copolymers can also be made such as by grafting polyoxyalkylene onto the polymer main chain. Preferably, the molecular weight range of the copolymer is 1000-100,000; more preferably 2,000-60,000; and most preferably the molecular weight range is 5,000-50,000.

As summarized above, exemplary methods of the present invention involve introducing the copolymer to clay-bearing aggregates at a quarry or mining plant, where the aggregate is manufactured or washed, or the copolymer can be introduced to the clay-bearing aggregates at a concrete mixing plant, where cement and aggregates are combined to make a hydratable mortar or concrete. In further exemplary methods, the copolymer can also be added directly into the mortar or concrete, separately or together or in mixture with one or more conventional admixtures, such as water reducers (including superplasticizers), and/or other admixtures.

Of the admixtures, so-called EO/PO type polymers, which have ethylene oxide ("EO") and/or propylene oxide ("PO") groups and polycarboxylate groups, are preferred. Cement dispersants contemplated for use in the invention include EO/PO polymers and EO/PO comb polymers, as described for example in U.S. Pat. Nos. 6,352,952 B1 and 6,670,415 B2 of Jardine et al., which mentioned the polymers taught in U.S. Pat. No. 5,393,343 assigned to W. R. Grace & Co.-Conn. These polymers are available from Grace under the trade name "ADVA®". Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. No. 6,569,234 B2 and U.S. Pat. No. 5,661,206. The amount of such polycarboxylate cement dispersants used within concrete may be in accordance with conventional use (e.g., 0.05% to 0.25% based on weight of active polymer to weight of cementitious material).

Thus, exemplary admixture compositions of the invention comprise: the above-described copolymer and at least one polycarboxylate cement dispersant, which is preferably a polycarboxylate comb polymer having EO and PO groups, as described above.

As summarized above, an exemplary method of the present invention comprises: introducing to clay-bearing sand aggregates, in an amount of 5% to 60% based on weight of clay treated, at least one copolymer obtained from monomer components (A), (B), and optionally (C), as follows:

(A) in an amount of 0.10-0.95 mole, a first monomer selected from quarternized vinylpyridine or other monomer represented by one of the following structures

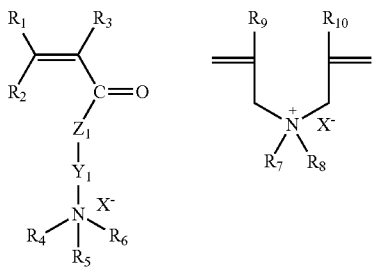

wherein $R_1$, $R_2$, and $R_3$ each independently represent hydrogen, —$CH_3$, or —COOH $R_4$, $R_5$, $R_6$, $R_7$, and $R_8$ each independently represent a $C_1$-$C_4$ alkyl group; $R_9$ and $R_{10}$ each independently represent hydrogen or —$CH_3$; $Z_1$ represents —O— or —NH—; $Y_1$ represents —$CH_2CH(OH)CH_2$— or —$(CH_2)_n$— wherein "n" represents an integer of 0 to 6; and X represents a halide, pseudohalide, or sulfate; and (B) in an amount of 0.05-0.90 mole, a second monomer represented by the structural formula

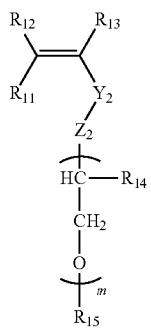

wherein $R_{11}$, $R_{12}$, $R_{13}$, $R_{14}$, and $R_{15}$ each independently represent hydrogen or $C_1$ to $C_3$ alkyl; $Z_2$ represents —O—, —COO—, —OCO—, —COHN—, or —NHCO—; $Y_2$ represents —$(CH_2)_n$— wherein "n" represents an integer of 0 to 6; and "m" represents an integer of 10 to 200 (and more preferably represents an integer of 10-100, and most preferably an integer of 20-70); and (C) in an amount of 0-0.20 mole, a third monomer selected from the group consisting of acrylate, methacrylate, acrylamide, methacrylamide, alkyl or dialkyl acrylamide, and methacrylamide monomers.

Monomer component (A) can be chosen, for example, from a list including diallyl dimethyl ammonium chloride (DADMAC), 2-acryloyloxyethyl trimethyl ammonium chloride (AETAC), 2-methacryloyloxyethyl trimethyl ammonium chloride (METAC), acrylamidopropyl trimethyl ammonium chloride (APTMAC), methacrylamidopropyl trimethyl ammonium chloride (MPTMAC), quaternized N-vinylpyridine, quaternized 2-vinylpyridine, quaternized 4-vinylpyridine.

As mentioned above regarding the first monomer component, "X" can represent a halide, pseudohalide, or a sulfate. Preferred halides are chloride and bromide. A pseudohalide is an anion that shares common structural and electronic features with the halides. Examples include cyanide, thiocyanate, azidothiocarbonate, selenocyanate, tellurocyanate, cyanate, azide, and their structural isomers.

Monomer component (B) can be chosen, for example, from methoxypolyethylene glycol acrylate, methoxypolyethylene glycol methacrylate, methoxypoly(ethylene-propylene glycol) acrylate, methoxypoly(ethylene-propylene glycol) methacrylate, alkoxypolyethylene glycol monoallyl ether, alkoxypoly(ethylene-propylene glycol) monoallyl ether, wherein the nominal molecular weight of the polyalkylene oxide is in the range of 500 to 8,000.

Monomer component (C) can be chosen, for example, from a group including 2-hydroxyethyl acrylate, 2-hydroxyethyl methacrylate, 2-hydroxypropyl acrylate, 2-hydroxypropyl methacrylate, acrylamide, methacrylamide, N-methyl acrylamide, N-methyl methacrylamide, N-methylol acrylamide, N-methylol methacrylamide, N-isopropyl acrylamide, N,N-dimethyl acrylamide, N,N-dimethyl methacrylamide.

In preferred embodiments of the invention, the molar ratio (A:B) of monomer component (A) to monomer component (B) is 0.20:0.80 to 0.90:0.10; and, more preferably, the molar ratio (A:B) is 0.50:0.50 to 0.85:0.15.

In other preferred embodiments, $R_7$ and $R_8$ of the above-described copolymer are —$CH_3$; and $R_9$ and $R_{10}$ of said copolymer are hydrogen.

In other preferred embodiments, $Z_1$ is oxygen and $Y_1$ is —$CH_2CH_2$—.

In still further embodiments, $Z_1$ is —NH— and $Y_1$ is —$CH_2CH_2CH_2$—.

In other embodiments of the invention, the above-described copolymer may contain two or more monomer components which are both represented by the structure of the first monomer (A). In other embodiments of the invention, the copolymer may contain two or more monomer components which are both represented by the structure of the second monomer (B).

In preferred embodiments of the invention, the copolymer has a Brookfield viscosity of 20 to 2000 Centipoise (hereinafter "cps") at 70 wt % aqueous solution at 20° C.; and, more preferably, the copolymer has a Brookfield viscosity of 60 to 500 cps at 70 wt % aqueous solution at 20° C.

Preferably, in methods and compositions of the invention, the amount of the copolymer introduced to the clay is 10% to 40%, and more preferably 10% to 30% by weight, based on the weight of the clay being treated.

In one exemplary method of the invention, the sand treated by the copolymer may then be combined with the components for making concrete, mortar, or asphalt. The present invention also relates to concrete, mortar, or asphalt containing the sand, clay, and above-described copolymer. The copolymer may be introduced to the sand by application to the clay-containing aggregates at the quarry or mine, or at the concrete mix plant where the aggregates are combined with cement to form hydratable mortar or concrete. The copolymer may be incorporated into the aggregates at the concrete mix plant before the cement binder is added, or into dry or wet mortar or concrete.

Thus, the invention also provides chemical admixtures containing the copolymer described above as well as to cementitious compositions containing said copolymer. It is contemplated that conventional chemical admixtures may be used in combination with the above-described copolymer in exemplary methods, admixture compositions, and cementitious compositions of the invention. Such conventional admixtures may include for example, lignin sulfonate, naphthalene sulfonate formaldehyde condensate (NSFC), melamine sulfonate formaldehyde condensate (MSFC), polycarboxylate polymer cement dispersants (such as the EO-PO type described above), gluconate, set retarders, set accelerators, defoamers, air entraining agents, surface active agents, or mixtures thereof.

Hence, the present invention also provides chemical admixture compositions comprising the above-mentioned copolymer in combination with at least one conventional admixture, such as water reducing admixtures (e.g., superplasticizers), defoamers, air entraining agents, surfactants, or mixtures thereof.

Exemplary cementitious compositions of the invention comprise at least one hydratable cement binder in combination with the above-described copolymer for treating clay, and optionally aggregates containing clay which requires the treatment described herein.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Example 1

A solution containing diallyldimethylammonium chloride (DADMAC) aqueous solution (59.7 g, 65% solid) and distilled water (120 ml) were transferred into a 500 ml flask equipped with a condenser, a mechanical stirrer, a thermocouple and a nitrogen inlet. The system was purged with nitrogen to remove air, and temperature of the solution was increased to 70 degrees Celcius. Into the flask, 50 ml of an aqueous solution of polyethylene glycol methacrylate (475-PEG-MA, 20.1 g) and 3-mercaptopropionic acid (3-MPA, 2 ml), and 20 ml aqueous solution of ammonium persulfate (APS, 2.86 g) were added simultaneously into the flask over a period of 8 hours. After addition, the polymerization reaction was held at 70° C. for 12 hours, then stopped by cooling to ambient temperature. The resulting polymer is called Polymer A.

Using the same procedure, the following polymers were synthesized and summarized in Table 1 below.

TABLE 1

Cationic graft polymer synthesized via procedure described in Example 1.

| | PEG-MA | | 375-PPG-MA | Cationic Monomer | | Brookfield |
|---|---|---|---|---|---|---|
| | Mn | Wt % | Wt %[a] | Type | Wt % | Viscosity[b] |
| Polymer A | 475 | 34 | 0 | DADMAC | 66 | NA |
| Polymer B | 1100 | 55 | 0 | DADMAC | 45 | 100 |
| Polymer C | 1100 | 27 | 10 | DADMAC | 63 | 120 |
| Polymer D | — | 0 | 44 | DADMAC | 56 | 120 |

[a]375-PPG-MA, poly(propylene glycol) methacrylate, Mn = 375.
[b]Brookfield viscosity was measured at 70 wt % solution, 20° C. using spindle 02 on model DV-I+ Brookfield viscometer.

Example 2

A 500 ml flask equipped with a condenser, a mechanical stirrer, a thermocouple and a nitrogen inlet, containing 100 ml water was purged with nitrogen then heated to 70° C.

Three aqueous solutions were added into the reaction flask simultaneously over a period of 8 hours: (1) 50 ml aqueous solution of 2-(methacryloyloxy)ethyl trimethylammonium chloride (METAC, 26.8 g); (2) 50 ml aqueous solution of 1100-PEG-MA (25 g) and 3-MPA (2 ml); and (3) 50 ml aqueous solution of APS (2.3 g). After addition, the reaction was hold at 70° C. for 12 hours then stopped by cooling to ambient temperature. The resulting polymer is called Polymer E.

Using the same procedure, the following polymers were synthesized and summarized in Table 2.

TABLE 2

Cationic graft polymer synthesized via procedure described in Example 2.

| | PEG-MA | | Cationic Monomer | | Brookfield |
|---|---|---|---|---|---|
| | Mn | Wt % | Type[a] | Wt % | Viscosity[b] |
| Polymer E | 1100 | 48 | METAC | 52 | NA |
| Polymer F | 1100 | 48 | APTMAC | 52 | NA |
| Polymer G | 1100 | 37 | METAC | 63 | 240 |
| Polymer H | 1100 | 23 | METAC | 77 | 360 |

[a]METAC: (methacryloyloxy)ethyl trimethylammonium chloride APTMAC: (3-acrylamidopropyl)trimethylammonium chloride
[b]Brookfield viscosity was measured at 70 wt % solution, 20° C. using spindle 02 on model DV-I+ Brookfield viscometer.

Example 3

The effect of the Polymer A made in Example 1 on concrete slump was tested against the separate components as illustrated in Table 3.

The copolymer of the current invention was evaluated by measuring the slump of a concrete sample that was formulated as follows: sand (1368 lb/yd$^3$), stone (1800 lb/yd$^3$), cement (658 lb/yd$^3$), water (267 lb/yd$^3$), superplasticizer, sodium montmorillonite (0.2% by weight of sand). For all concrete mixes, an EO/PO superplasticizer was used at 0.12% active (by weight of cement) while the cationic graft polymer as well as its starting monomers was tested at a dose of 20 wt % of sodium montmorillonite.

The addition time is as following. Sand, 20% water, sodium montmorillonite and the monomers or polymers are added together and mixed for 4 minutes, then stone was added into this mixture and mixed for another one minute. After that, into this mixture, cement and 80% water were added and mixed for another 2 minutes. And at last, an EO/PO superplasticizer was added into the above mixture and the mix was finished in 7 minutes.

In Table 3, Polymer A was compared with its monomer components (DADMAC and 475-PEG-MA) and a control concrete sample that contained "none" of these components. As shown in Table 3, Polymer A of this invention clearly exhibits clay mitigation effect as it provides a higher slump than its monomer components and the control sample.

TABLE 3

| Concrete test | |
| --- | --- |
| Additive | Slump (in) |
| None | 2.50 |
| DADMAC | 3.50 |
| 475-PEG-MA | 2.75 |
| Polymer A | 5.50 |

Example 4

Using the procedure in Example 3, Polymer E was evaluated, and the test results are illustrated in Table 4.

In Table 4, Polymer E was compared with its monomer components (METAC and 1100-PEG-MA) and a control concrete sample that contained "none" of these components. As shown in Table 4, Polymer E clearly provides a higher slump than its monomer components and the control sample, confirming its clay mitigating effect.

TABLE 4

| Concrete Test | |
| --- | --- |
| Additive | Slump (in) |
| None | 2.50 |
| METAC | 3.00 |
| 1100-PEG-MA | 2.75 |
| Polymer E | 5.75 |

Example 5

Using the procedure in Example 3, Polymer F was evaluated. The concrete test result is illustrated in Table 5. In Table 5, Polymer F was compared with its monomer components (APTAC and 1100-PEG-MA) and a control concrete sample that contained "none" of these components. The results in Table 5 indicate that Polymer F of this invention clearly has a clay mitigation effect.

TABLE 5

| Concrete Test | |
| --- | --- |
| Additive | Slump (in) |
| None | 2.50 |
| APTAC | 3.25 |
| 1100-PEG-MA | 2.75 |
| Polymer F | 5.50 |

Example 6

Using the procedure in Example 3 but different polymer dosage, Polymer B, Polymer G and Polymer H were evaluated. The concrete test results are illustrated in Table 6.

In Table 6, three polymers of this invention were compared with a control concrete sample that contained "none" of these polymers. As shown in Table 6, Polymers B, G and H significantly improved slump performances than the control sample. When the dosage of the polymer was increased from 15% to 25% to dry clay, the slump performance was increased as well.

TABLE 6

| | ConcreteTest | | |
| --- | --- | --- | --- |
| | Slump (in) at dosage of | | |
| Additive | 0 | 15 wt % to clay | 25 wt % to clay |
| None | 3.00 | — | — |
| Polymer B | | 4.25 | 6.75 |
| Polymer G | | 5.25 | 7.00 |
| Polymer H | | 4.50 | 6.75 |

Example 7

The effects of the Polymer C and Polymer D on mortar workability were tested against a control mortar sample that contained "none" of these polymers. The mortar test results were illustrated in Table 7.

Mortar was prepared in the traditional manner as follows: sand (1350 g), cement (650 g), sodium montmorillonite (2.7 g), water (250 g), EO/PO superplasticizer (0.12% active by weight of cement), and polymers of this invention were added at 5% and 10% based on the weight of sodium montmorillonite. Sand was blended with sodium montmorillonite and then blended with the cationic polymer prior to mixing into a mortar. The workability was determined by measuring the slump and flow and was calculated by the following equation: Workability=slump+(flow 1+flow 2)/2-100.

As shown in Table 7, the addition of Polymer C or D clearly improved mortar workability. Increasing the dosage of the polymer led to higher mortar workability.

TABLE 7

| Mortar test | | |
| --- | --- | --- |
| | wt % on sodium montmorillonite | Workability (mm) |
| None | 0 | 75 |
| Polymer C | 5 | 142 |
| Polymer D | 5 | 187 |
| Polymer C | 10 | 236 |
| Polymer D | 10 | 237 |

The foregoing examples and embodiments were presented for illustrative purposes only and not intended to limit the scope of the invention.

It is claimed:

1. A composition comprising: a plurality of clay-bearing sand aggregates and
    (i) a water-reducer or superplasticizer admixture; and
    (ii) at least one copolymer obtained from monomer components (A), (B), and optionally (C), as follows:
    (A) a first monomer selected from quaternized vinylpyridine or other cationic monomer represented by the following structures

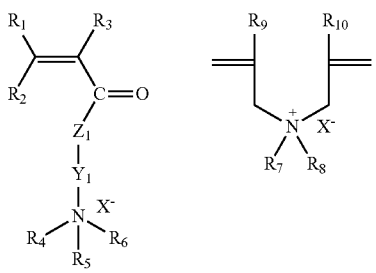

wherein
- $R_1$, $R_2$, and $R_3$ each independently represent hydrogen, —$CH_3$, or —COOH;
- $R_4$, $R_5$, $R_6$, $R_7$, and $R_8$ each independently represent a $C_1$-$C_4$ alkyl group;
- $R_9$ and $R_{10}$ each independently represent hydrogen or —$CH_3$;
- $Z_1$ represents —O— or —NH—;
- $Y_1$ represents —$CH_2CH(OH)CH_2$— or $(CH_2)_n$ wherein "n" represents an integer of 0 to 6;
- X represents a halide, pseudohalide, or sulfate;
(B) a second monomer represented by the structural formula

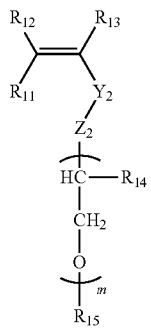

wherein
- $R_{11}$, $R_{12}$, $R_{13}$, $R_{14}$, and $R_{15}$ each independently represent hydrogen or $C_1$ to $C_3$ alkyl;
- $Z_2$ represents —O—, —COO—, —OOC—, —COHN—, or —NHCO—;
- $Y_2$ represents —$(CH_2)_n$— wherein "n" represents an integer of 0 to 6; and
- "m" represents an integer of 10 to 200; and
(C) a third monomer selected from the group consisting of acrylate, methacrylate, acrylamide, methacrylamide, alkyl or dialkyl acrylamide, and methacrylamide monomers.

2. The composition of claim 1 further comprising a cement binder.

3. The composition of claim 1 wherein the copolymer has a molecular weight of 1,000-100,000.

4. The composition of claim 1 wherein the copolymer has a molecular weight of 2,000-60,000.

5. The composition of claim 1 wherein the copolymer has a molecular weight of 5,000-50,000.

6. The composition of claim 1 wherein, in the second monomer component, "m" represents an integer of 10-100.

7. The composition of claim 1 wherein, in the second monomer component, "m" represents an integer of 20-70.

8. The composition of claim 1 wherein the molar ratio (A:B) of said first monomer component (A) to the second monomer component (B) is 0.20:0.80 to 0.90:0.10.

9. The composition of claim 8 wherein the molar ratio (A:B) of the first monomer component (A) to said second monomer component (B) is 0.50:0.50 to 0.85:0.15.

10. The composition of claim 1 wherein each of $R_7$ and $R_8$ are —$CH_3$ groups, and each of $R_9$ and $R_{10}$ are hydrogen.

11. The composition of claim 1 wherein $Z_1$ is oxygen and $Y_1$ is —$CH_2CH_2$—.

12. The composition of claim 1 wherein $Z_1$ is —NH— and $Y_1$ is —$CH_2CH_2CH_2$—.

13. The composition of claim 1 wherein the copolymer has two or more monomer components which are represented by one of the structures of the first monomer component (A).

14. The composition of claim 1 wherein the copolymer has two or more monomer components which are represented by the structure of the first monomer component (B).

15. The composition of claim 1 wherein the copolymer has a Brookfield viscosity of 20 to 2000 cps at 70 wt % aqueous solution at 20° C.

16. The composition of claim 15 wherein the copolymer has a Brookfield viscosity of 60 to 500 cps at 70 wt % aqueous solution at 20° C.

17. The composition of claim 1 wherein the amount of the copolymer introduced to the clay-bearing sand aggregates is 10% to 40% by weight based on the weight of the clay contained in the clay-bearing sand aggregates.

18. The composition of claim 17 wherein the amount of the copolymer introduced to the clay-bearing sand aggregates is 10% to 30% by weight based on the weight of the clay contained in the clay-bearing sand aggregates.

19. The composition of claim 1 wherein the copolymer is introduced to the clay-bearing sand aggregates separately, followed by addition of a water reducing admixture.

20. The composition of claim 1 wherein the copolymer is introduced to the clay-bearing sand aggregates together with an EO/PO polycarboxylate superplasticizer.

* * * * *